Patented Sept. 5, 1950

2,521,303

UNITED STATES PATENT OFFICE 2,521,303

COPOLYMERS FROM ALLYL SUCCINYL ALLYL GLYCOLATE AND ACRYLIC ESTERS

Harry T. Neher, Bristol, Edwin H. Kroeker, Cheltenham, and Willard J. Croxall, Bryn Athyn, Pa., assignors to Rohm & Haas Company, Philadelphia, Pa., a corporation of Delaware No Drawing. Application March 10, 1948,
Serial No. 14,144

7 Claims. (Cl. 260—78.3)

This invention relates to copolymers of acrylic esters and allyl succinyl allyl glycolate.

It has been proposed to polymerize many types of allyl compounds. Many allyl compounds, however, do not yield sound castings or are cast into coherent objects only with great difficulty and uncertainty. Among compounds which behave in this manner is allyl succinyl allyl glycolate, which polymerizes without particular difficulty but which fails to give useful polymers. Objects cast therefrom are usually replete with strains and/or cracks, with the result that the polymers lack strength.

We have discovered that, in spite of the marked lack of promise of allyl succinyl allyl glycolate, this substance may be used in preponderant proportion to form useful copolymers with acrylic esters.

The acrylic esters which yield valuable copolymers are esters of lower aliphatic saturated alcohols, including methyl, ethyl, propyl, isopropyl, and butyl, isobutyl, or tert.-butyl acrylate and methacrylate. A single acrylic ester may be used or a mixture of two or more such esters. A combination of ten to forty parts of one or more of these acrylic esters with ninety to sixty parts of allyl succinyl allyl glycolate gives copolymers with a rather remarkable set of properties. The copolymers are very resistant to abrasion and hard, yet they have good flexural and impact strengths.

Methyl methacrylate permits attaining the maximum of abrasion resistance for these copolymers along with high strength. At the other end of the group of acrylic esters, butyl acrylate or butyl methacrylate permits development of a highly satisfactory abrasion resistance along with toughness and good strength. The copolymers from the butyl esters have the minimum tendency toward bubble formation because of the high boiling point of the monomeric esters.

When the proportions of allyl succinyl allyl glycolate to acrylic monomer are seventy to eighty-five parts of the former to thirty to fifteen parts of the latter, copolymers are obtained which have the optimum balance of properties. It appears rather remarkable to us that such a high proportion of an allyl ester, which by itself gives polymers of poor strength, yields copolymers with highly useful properties.

For the preparation of the copolymers of this invention, allyl succinyl allyl glycolate in preponderant proportion is mixed with one or more of the acrylic esters and a peroxide catalyst added thereto and the resulting mixture heated. An organic peroxide may be added in an amount from about 0.5% to about 5% of the weight of the monomers, the optimum amount varying with the choice of organic peroxide and polymerizing temperature. When a peroxide with high thermal stability is used, such as tert.-butyl hydroperoxide, the amount of peroxide may be in the upper range of percentage, or higher temperatures of copolymerizing may be used. When benzoyl peroxide is used, the best range is 1% to 3%, the use of higher amounts often leading to the development of color.

With active catalysts such as benzoyl peroxide or acetyl benzoyl peroxide, temperatures of about 70° to 80° C. are sufficient to promote polymerization in a feasible time. It has been found, for example, that at temperatures of 74° to 82° C. hard polymers are formed in ten to twenty hours, but higher temperatures may be used to accelerate the reaction, particularly after a gel has been formed at a lower temperature. For completing polymerization, temperatures of 110° to 150° C. have been found useful.

It is the usual practice to perform copolymerization in molds. Suitable molds may be formed in a number of ways from glass sheets held in spaced relation. When the mixture of monomers has set up, the mold is desirably freed of spacers, if rigid, or the spacers are allowed to collapse as the cast object contracts. The copolymerization may then be completed without danger of formation of strains. The molds may be readily stripped from the copolymers while they are warm or hot, even though the copolymers appear somewhat friable. They become very hard and strong when cool.

While there are a number of ways in which allyl succinyl allyl glycolate may theoretically be prepared, a particularly satisfactory method comprises forming the half acid ester by reaction of one mol of succinic anhydride and one mol of allyl alcohol, converting the carboxylic acid group thereof to the salt form, and reacting the resulting salt with the allyl ester of an α-haloacetic acid.

Allyl chloroacetate, as a typical haloacetate, may be readily prepared by esterifying chloroacetic acid with allyl alcohol. A strongly acid catalyst may be used and the esterification carried out in a solvent which permits removal of the water of esterification azeotropically. Methallyl chloroacetate may be similarly prepared except that, in this case, it is advisable to omit the addition of an esterifying catalyst.

The preparation of allyl succinyl allyl glycolate may be performed by the following typical procedure:

Example 1

The preparation is desirably carried out in a three-necked vessel equipped with stirrer, thermometer, reflux condenser with water separator, and funnel for adding reagents. The flask is charged with 659 parts of succinic anhydride and 522 parts of allyl alcohol. The mixture is then heated at 60°–70° C. for a time sufficient to ensure complete reaction to form the mono-ester. The reaction product is then treated with 2,000 parts of xylol and 371 parts of soda ash in small portions. The reaction mixture is heated to remove the water of neutralization. When all the water has been removed, the mixture becomes very thick and may form a gelatinous mass. Thereupon, 1,000 parts of allyl chloroacetate and ten parts of a polymerization inhibitor such as $\beta$-naphthol are added. The resulting mixture is then heated under reflux until the desired metathesis is fairly complete. It is then cooled, washed with a 20% soda ash solution, and separated. The organic layer is dried on anhydrous potassium carbonate and distilled with fractionation under reduced presure. The desired product passes over at 140°–143° C. at 3 mm.

Methallyl chloroacetate may be used in place of the allyl chloroacetate in the above procedure. In this case, the final product is allyl succinyl methallyl glycolate, which distils at 145° C. at 1.5 mm.

If succinic anhydride is treated with methallyl alcohol and the resulting half ester converted to a salt which is then reacted with allyl chloroacetate, the final product is methallyl succinyl allyl glycolate, which distils at 145° C. at 2 mm.

If the preparation is accomplished with the half methallyl succinate and methallyl chloro- or bromo-acetate, the final product is methallyl succinyl methallyl glycolate, which distils at 150° C. at 2 mm.

All of these esters are liquids at room temperature and are capable of yielding interesting copolymers with ethenoids, of which the lower acrylic esters are now those of greatest value. These copolymers are useful as cast sheets or other objects in which good strength, clarity, and abrasion resistance are required, as in windshields, architectural forms, furniture, novelties, and the like.

In the following examples, showing the preparation of typical copolymers, physical data are reported for tests of strength and abrasion resistance. These data were obtained by accepted methods. Abrasion resistance is given in terms of the relative light-scattering of a sample of one of the new copolymers after being subjected to abrasion in the Taber tester. The abraded sample is compared with a standard sample of polymeric methyl methacrylate abraded in the same way. The lower the abrasion value the greater is the abrasion resistance. In the Taber method, an abrasive wheel is rotated against the samples at uniform pressures for a given number of revolutions.

Example 2

To a mixture of ninety parts of allyl succinyl allyl glycolate and ten parts of methyl methacrylate were added two parts of benzoyl peroxide and one part of methacrylic acid. The mixture was warmed, filtered, and poured into a mold, which was heated for sixteen hours at 78° C. and cured for one hour at 130° C. A clear, colorless sheet was obtained. It had a Taber abrasion value of 28%, a flexural strength of 96%, and an impact strength of 70%, compared to the standard polymethacrylate sheet.

Example 3

To seventy-five parts of allyl succinyl allyl glycolate and twenty-five parts of methyl methacrylate were added one part of benzoyl peroxide and one-half part of tert.-butyl perbenzoate. The mixture was warmed, filtered, and poured into a mold, which was heated for eighteen hours at 80° C. and cured for one and one-half hours at 120° C. A crack-free, colorless sheet was obtained. It had a Taber abrasion value of 30%, a flexural strength of 102%, and an impact strength of 74%, compared to the standard polymethacrylate sheet.

Example 4

To sixty parts of allyl succinyl allyl glycolate and forty parts of methyl methacrylate were added one part of acrylic acid and one part of benzoyl peroxide. The mixture was warmed, filtered, and poured into a mold, which was heated for sixteen hours at 78° C. and cured one hour at 140° C. A crack-free, colorless sheet was obtained. It had a Taber abrasion value of 60%, a flexural strength of 110%, and an impact strength of 74%, compared to the standard polymethacrylate sheet.

Example 5

To eighty parts of allyl succinyl allyl glycolate and twenty parts of ethyl acrylate were added one and one-half parts of acrylic acid, one part of benzoyl peroxide, and one-half part of tert.-butyl perbenzoate. The mixture was warmed, filtered, and poured into a mold, which was heated for sixteen hours at 80° C. and cured one and one-half hours at 120° C. A crack-free, colorless sheet was obtained. It had a Taber abrasion value of 50%, a flexural strength of 104%, and an impact strength of 63%, compared to the standard polymethacrylate sheet.

Example 6

To eighty parts of allyl succinyl allyl glycolate and twenty parts of butyl acrylate were added one and one-half parts of acrylic acid, one part of benzoyl peroxide, and one-half part of tert.-butyl perbenzoate. The mixture was warmed, filtered, and poured into a mold, which was heated for sixteen hours at 80° C. and cured for one and one-half hours at 120° C. A crack-free, colorless sheet was obtained. It had a Taber abrasion value of 50%, a flexural strength of 74%, and an impact strength of 86%, compared to the standard polymethacrylate sheet.

Example 7

To seventy-five parts of allyl succinyl allyl glycolate and twenty-five parts of butyl acrylate were added one and one-half parts of methacrylic acid, one part of benzoyl peroxide, and one-half part of tert.-butyl perbenzoate. The mixture was warmed, filtered, and poured into a mold, which was heated for sixteen hours at 84° C. and cured for two hours at 125° C. A crack-free, colorless sheet was obtained. It had a Taber abrasion value of 50%, a flexural strength of 89%, and an impact strength of 63%, compared to the standard polymethacrylate sheet.

The acrylic or methacrylic acid used in the above preparations caused the copolymers to adhere slightly to the molds and thus prevented "let-goes." When such an acid is used, the casting and mold are preferably separated while hot. The acid is not, however, necessary and is sometimes actually undesirable. Smooth sheets with higher strengths than shown above are readily obtained without the use of acid. In fact, the best results are often obtained when the casting contains a release agent, such as a fatty acid. In such cases, it has been possible to obtain perfect cast-sheets with two or more times the abrasion resistance of polymethyl methacrylate and with flexural strengths about equal to commercial acrylic resin sheets.

*Example 8*

A mixture was prepared from seventy-five parts of allyl succinyl allyl glycolate and twenty-five parts of methyl methacrylate. Thereto were added with warming one part of benzoyl peroxide, one-half part of tert.-butyl perbenzoate, and one-tenth part of oleic acid. The resulting mixture was poured into large molds of plate glass held by clamps and fitted with flexible spacers. The molds were heated overnight in an oven at 80° C., and then one mold was heated for one hour at 110° C. while another was heated for two hours at 110° C. The first sheet had a Taber abrasion value of 33%, a flexural strength of 110%, and an impact strength of 87%. The second sheet had an abrasion value of 30%, a flexural strength of 110%, and an impact strength of 95%.

Parts shown above are by weight.

We claim:

1. A copolymer of sixty to ninety parts by weight of allyl succinyl allyl glycolate and forty to ten parts of an ester of an aliphatic saturated monohydric alcohol of not over four carbon atoms and an acid selected from the group consisting of acrylic acid and methacrylic acid.

2. A copolymer of seventy to eighty-five parts by weight of allyl succinyl allyl glycolate and thirty to fifteen parts of an ester of an aliphatic saturated monohydric alcohol of not over four carbon atoms and an acid selected from the group consisting of acrylic acid and methacrylic acid.

3. A copolymer of sixty to ninety parts by weight of allyl succinyl allyl glycolate and forty to ten parts of an ester of acrylic acid and an aliphatic saturated monohydric alcohol of not over four carbon atoms.

4. A copolymer of sixty to ninety parts by weight of allyl succinyl allyl glycolate and forty to ten parts of an ester of methacrylic acid and an aliphatic saturated monohydric alcohol of not over four carbon atoms.

5. A copolymer of sixty to ninety parts by weight of allyl succinyl allyl glycolate and forty to ten parts of methyl methacrylate.

6. A copolymer of seventy to eighty-five parts by weight of allyl succinyl allyl glycolate and thirty to fifteen parts of methyl methacrylate.

7. A copolymer of seventy to eighty-five parts by weight of allyl succinyl allyl glycolate and thirty to fifteen parts of butyl acrylate.

HARRY T. NEHER.
EDWIN H. KROEKER.
WILLARD J. CROXALL.

REFERENCES CITED

The following references are of record in the file of this patent:

UNITED STATES PATENTS

| Number | Name | Date |
| --- | --- | --- |
| 2,202,846 | Garvey | June 4, 1940 |
| 2,387,932 | Muskat et al. | Oct. 20, 1945 |
| 2,449,612 | Mast et al. | Sept. 21, 1948 |